(12) United States Patent
Rathinasamy et al.

(10) Patent No.: US 11,280,969 B2
(45) Date of Patent: Mar. 22, 2022

(54) MECHANICAL CABLE RELEASE SYSTEMS AND METHODS

(71) Applicant: DELL PRODUCTS L.P., Round Rock, TX (US)

(72) Inventors: Shree Rathinasamy, Round Rock, TX (US); Victor Teeter, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 16/902,199

(22) Filed: Jun. 15, 2020

(65) Prior Publication Data
US 2021/0389530 A1    Dec. 16, 2021

(51) Int. Cl.
*G02B 6/38* (2006.01)
*G02B 6/42* (2006.01)

(52) U.S. Cl.
CPC ......... *G02B 6/3898* (2013.01); *G02B 6/4292* (2013.01)

(58) Field of Classification Search
CPC .. G02B 6/3898; G02B 6/4292; H01R 13/514; H01R 13/518

USPC ................ 385/53–78, 92, 134–135, 139
See application file for complete search history.

(56) References Cited

U.S. PATENT DOCUMENTS 6,702,475 B1 * 3/2004 Giobbio ............... G02B 6/3825
385/53

OTHER PUBLICATIONS

"Fiber Optic Cabling Solutions," [online], [Retrieved May 20, 2020]. Retrieved from Internet <URL: http://www.cables-solutions.com/do-you-know-about-push-pull-tab-patch-cable.html> (3pgs).

* cited by examiner

*Primary Examiner* — Michael P Mooney
(74) *Attorney, Agent, or Firm* — North Weber & Baugh LLP

(57) ABSTRACT

Release mechanisms and methods for engaging and disengaging cables from receptacles comprise an actuator that may be implemented at a receptacle, e.g., at a switch panel that comprises ports designed to engage with a connector. Once a force is exerted on the actuator, it causes one or more prongs to move toward a locking latch of the connector, until the latch is sufficiently depressed such as to unlock the connector and allow the connector to disengage from the receptacle.

20 Claims, 10 Drawing Sheets

100

Prior Art

Prior Art

Prior Art

Prior Art

Prior Art

FIG. 3A

Prior Art

MECHANICAL CABLE RELEASE SYSTEMS AND METHODS

BACKGROUND

The present disclosure relates generally to fiber optic connectors and receptacles. More particularly, the present disclosure relates to release systems and methods for mating and disconnecting fiber optic cable assemblies from fiber optic transceivers and other receptacles.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Network cables such as fiber optic cables used in enterprise data centers that operate high-speed networks oftentimes use connectors that have pull tabs, which permit easy release of connectors from complementary hardware, such as transceivers. Network cables with pull tabs suffer from a major drawback related to frequent handling of connectors, which tends to cause permanent damage to the tabs and, sometimes, to the cable itself or the transceiver, increasing material and operating cost. Accordingly, it is highly desirable to find new robust, low-cost solutions for reliably mating and releasing various cables from transceivers and similar devices.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 1 ("FIG. 1")

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment,"

"embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms may be replaced by other terminologies referring to a group of one or more bits, and may be used interchangeably. The terms "packet" or "frame" shall be understood to mean a group of one or more bits. The words "optimal," "optimize," "optimization," and the like, refer to an improvement of an outcome or a process and do not require that the specified outcome or process has achieved an "optimal" or peak state.

Any headings used herein are for organizational purposes only and shall not be used to limit the scope of the description or the claims. Each reference/document mentioned in this patent document is incorporated by reference herein in its entirety.

It shall be noted that although embodiments described herein may be within the context of fiber optic cables and transceiver assemblies, aspects of the present disclosure are not so limited. For example, devices comprising locking mechanisms may mate to any type of switch, module, receptacle, or other structure that comprises embodiments of the present disclosure. Similarly, other types of electrical, optical, and electro-optical cable may benefit from embodiments of the present disclosure. Accordingly, aspects of the present disclosure may be applied or adapted for use in other contexts that may benefit from a locking and or release mechanism in accordance with various embodiments of the present disclosure.

In this document, depending on context, the terms "cable," "cable assembly," and "connector" may be used interchangeably. Similarly, "cable connection flap," "latch" and "locking latch" may be used interchangeably.

Data centers increasingly use fiber optic cables to operate their high-speed networks to establish a communicative connection between a pluggable module and an electrical communication connector of a receptacle assembly. Cables that connect networking hardware, such as transceivers, come in different make, models, and types, including Direct Attach Copper (DAC) cable types. Most fiber optic connectors have, as an integrated release mechanism, a pull tab that allows a connector to disengage from complementary hardware, such as a common transceiver module.

Figure 1A:
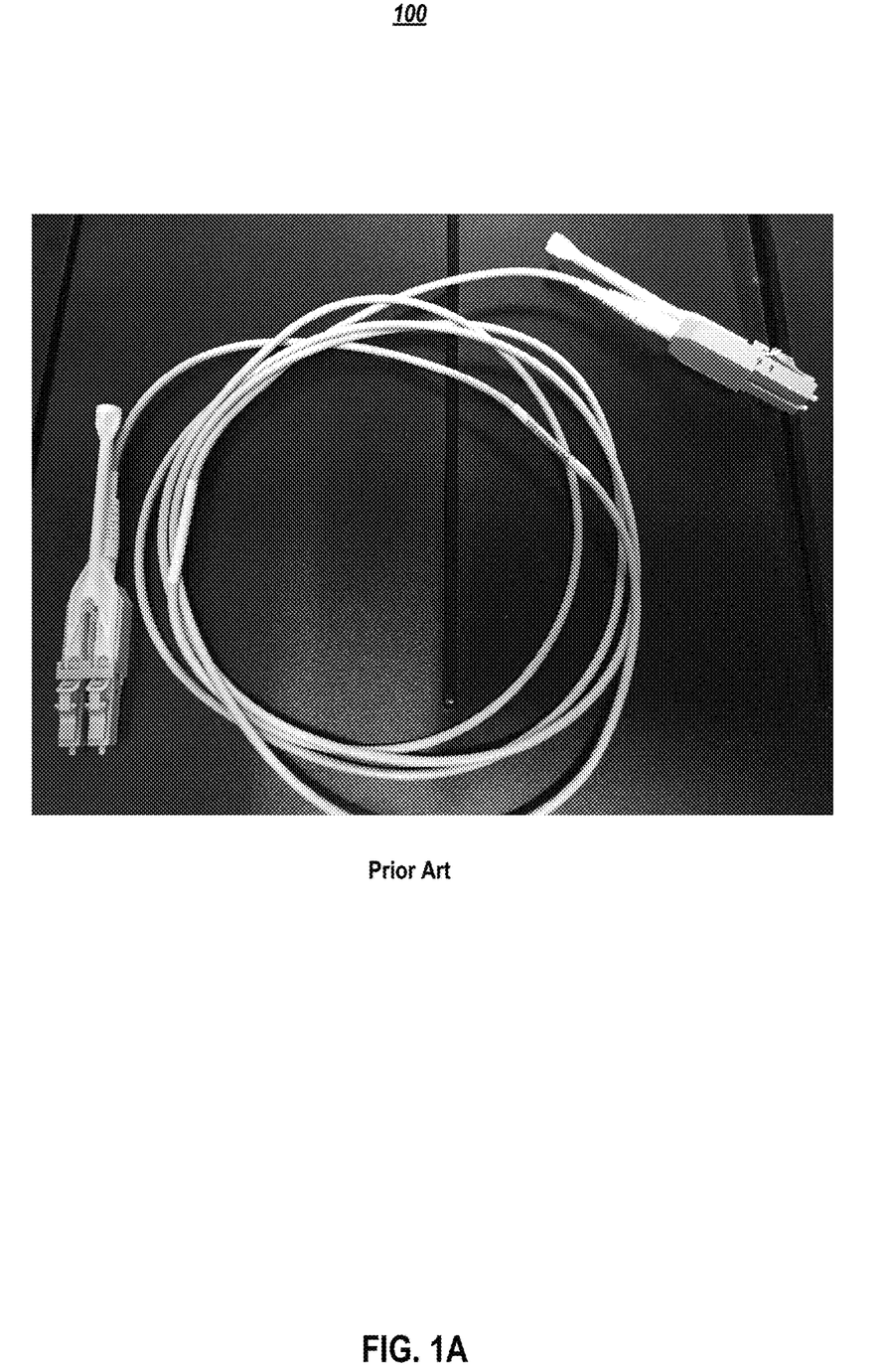
FIG. 1A depicts a conventional fiber optic cable assembly having connectors that use a pull tab in their unlocking mechanism.
Figure 1B:
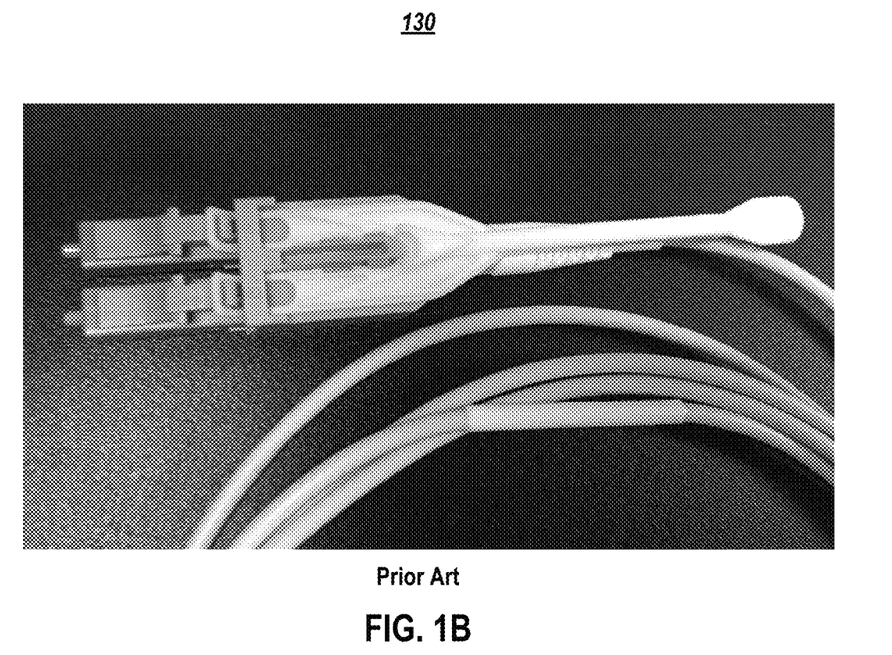
FIG. 1B is a top view of a conventional fiber optic connector as shown in FIG. 1A.
Figure 1C:
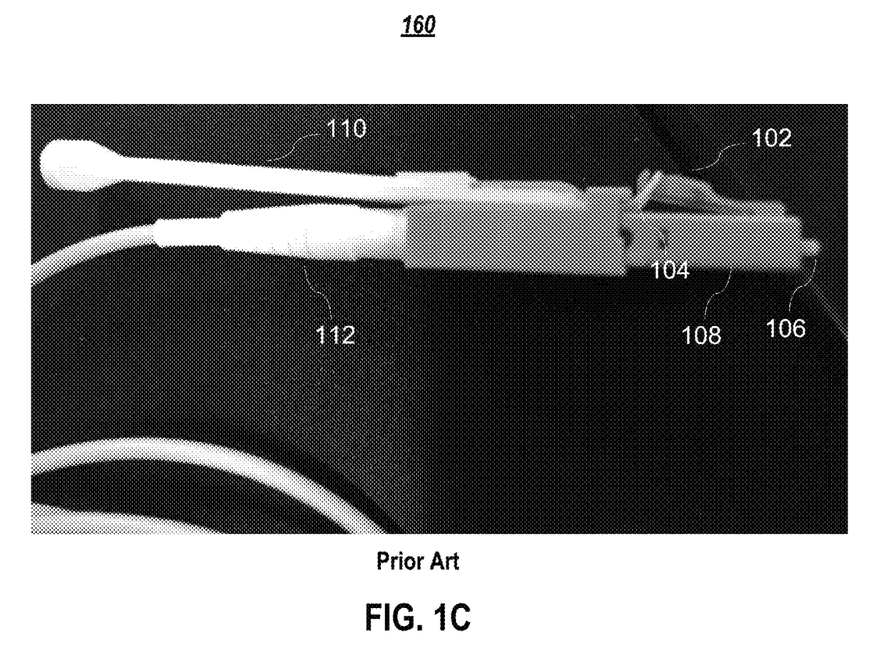
FIG. 1C is a side view of the connector shown in FIG. 1B.

FIG. 1A through FIG. 1C depict a conventional fiber optic cable assembly having connectors that use a pull tab as part of their unlocking mechanism. For example, connector 160 comprises pull tab 110, latch 102, hook 104, housing 108, shaft 112, and fiber optic cable 106. In operation, once connector 160 is inserted into a cage member (not shown), e.g., in a transceiver or any other a pluggable module, latch 102 locks connector 160 to the cage member, e.g., via a latch tab, such that fiber optic cable 106 maintains mechanical contact with a counterpart fiber optic cable inserted into the transceiver that connector 160 plugs into. To release connector 160 from its locking or engaged position in the transceiver, a pressing force needs to be exerted on latch 102 to facilitate an unlocking action, for example, by pulling pull tab 110 rearward such as to cause hook 104 located at the end of pull tab 110 to pull latch 102 down in a downward motion to disengage latch 102 from the cage member in the transceiver, thereby, disengaging the locking mechanism.

Figure 2:
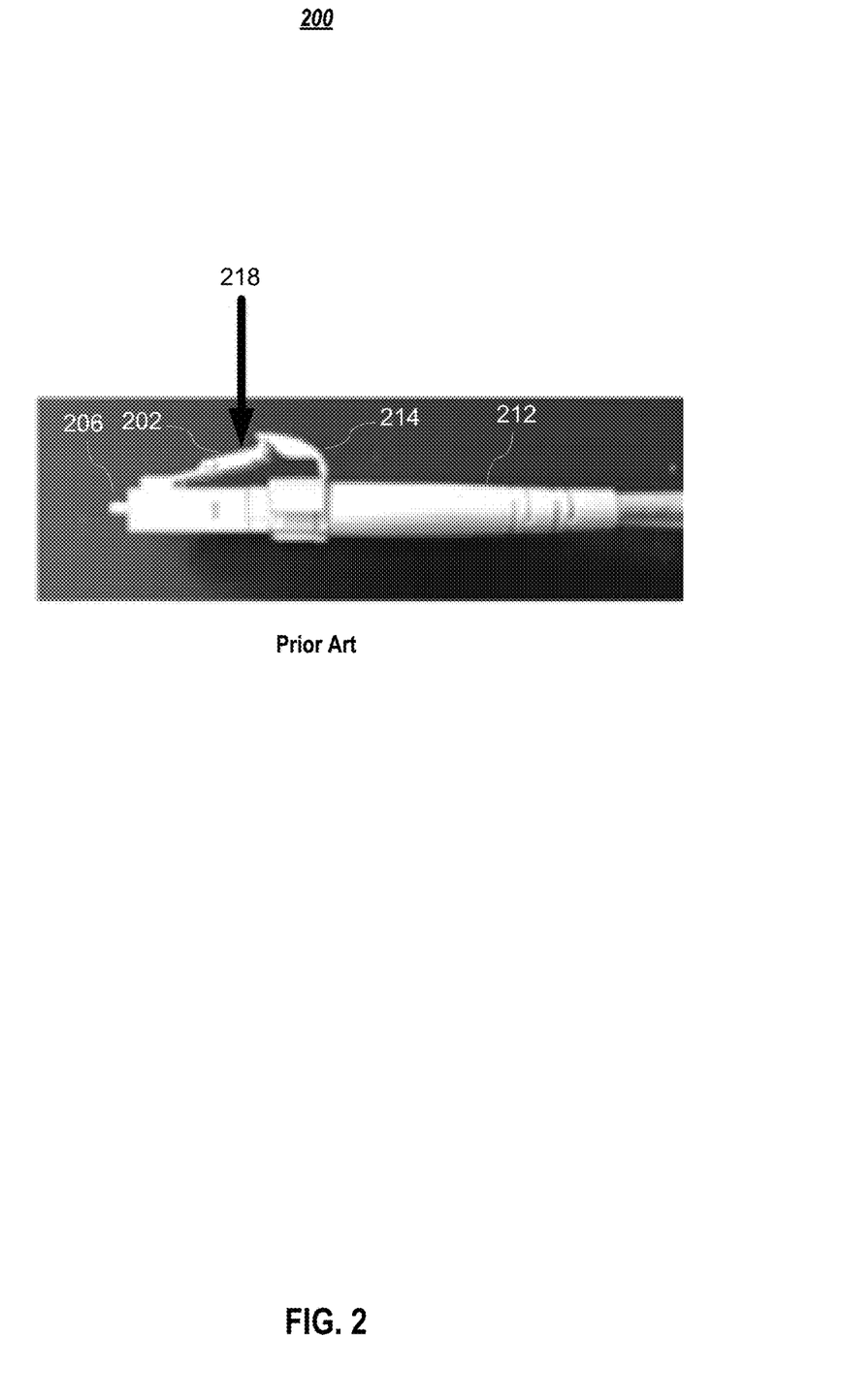
FIG. 2 depicts a conventional fiber optic cable assembly having a locking mechanism without a pull tab.

For comparison, FIG. 2 depicts a commonly used fiber optic cable assembly 200 having a locking mechanism that comprises latch 202, fiber optic cable 206, shaft 212, and tether 214 but has no pull tab. Pushing downward on latch 202 in the direction of arrow 218 disengages latch 202 from tether 214 and the cage member in the transceiver, thus, allowing connector 200 to be pulled rearward, e.g., by gripping shaft 212 (e.g., a PVC jacket) at the rear portion of connector 200.

Conventional latches have various known shortcomings. For instance, some latches overmold the tether directly to the stamped metal latch. The tether is then integrally secured to the latch and extends from the pluggable module, which may be costly to manufacture and assemble. The tether is pre-assembled to the latch. The tether is unable to be applied to the latch after the latch is assembled to the pluggable module. Therefore, a need remains for a latch release device that may be easily assembled to a latch of a pluggable module.

Figure 3A:
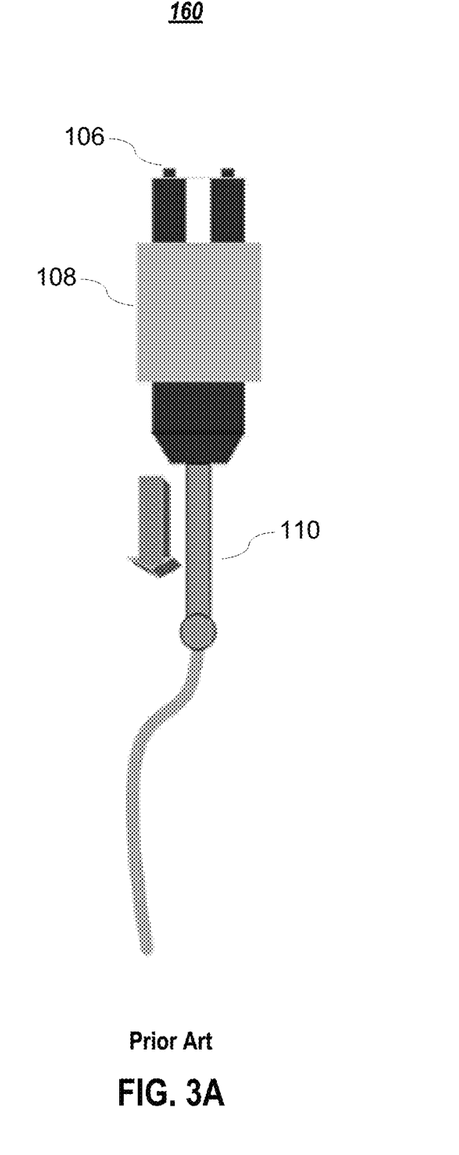
FIG. 3A is a top view of the conventional fiber optic cable assembly shown in FIG. 1B.

FIG. 3A is a schematic of the fiber optic cable assembly shown in FIG. 1B. A fiber optic cable used, e.g., in test equipment in data centers, vendor test labs, and similar environments, requires frequent connecting and releasing connector 160 from a transceiver port, e.g., transceiver port 330 on transceiver module 320 shown in FIG. 3B. However, frequent handling of connector 160 increases the likelihood that pull tab 110 will eventually break off. This is mainly due to the fact that pull tab 110 is typically made from relatively thin, soft material, such as plastic, and is prone to snapping when excessive force is exerted, e.g., when attempting to pull out connector 160 from transceiver module 320.

Figure 3B:
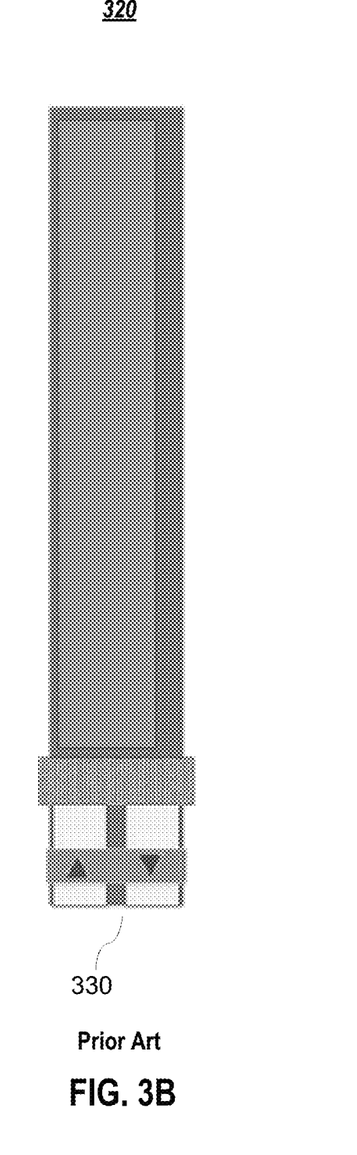
FIG. 3B is a top view of a conventional transceiver module.

Cables with partially or wholly damaged tabs usually need to be replaced, resulting in increased material and operating cost for data centers and in similar applications. In addition, removing a cable with a damaged tab from a transceiver oftentimes requires force that may cause further damage to other components of the high-speed network, e.g., the fragile fiber optic cable 106, transceiver 320, or transceiver port 330. This, in turn, may necessitate a call for support staff, extend overall equipment down time, and further increase operating and maintenance costs. Therefore, it would be desirable to have easy to handle, low-cost systems and methods that allow for simple and reliable mating and releasing fiber optic and other cables.

Figure 4A:
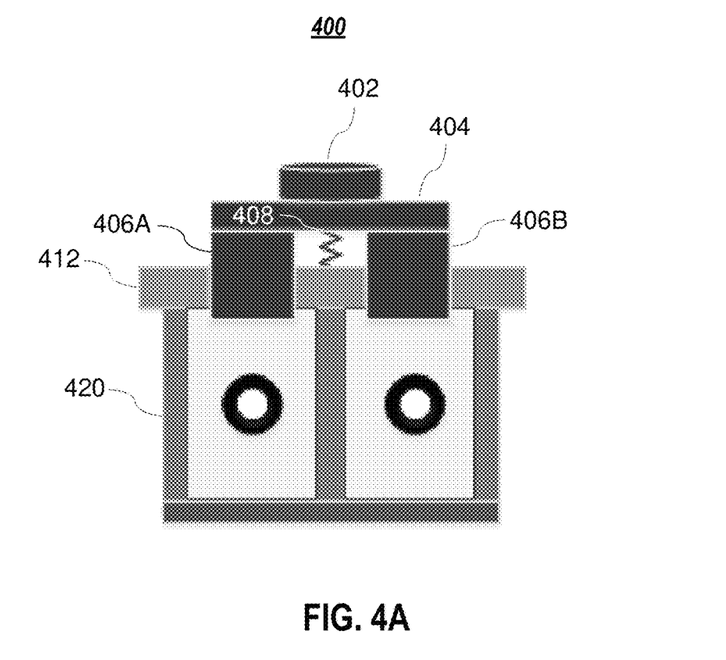
FIG. 4A and FIG. 4B are front views of a release mechanism according to embodiments of the present disclosure.

FIG. 4A is a front view of a release mechanism, according to embodiments of the present disclosure, depicting prongs in a non-depressed position. Release mechanism 400 comprises actuator 402, push plate 404, prongs 406A, 406B, spring 408, plate 412, and transceiver housing 420. In embodiments, actuator 402, prongs 406A, 406B, and spring 408 may be affixed to push plate 404. In embodiments, plate 412 comprises through holes of any suitable shape (e.g., slots) and dimensions to allow prongs 406A, 406B to slide in and out, e.g., along a same vertical axis as one or more springs, such as spring 408 located between prongs 406A, 406B.

It is understood that components of release mechanism 400 may preferably be made of rigid material, such as plastic, metal, or any combination thereof. It is further understood that although actuator 402 is depicted in the shape of a button, this is not intended as a limitation on the present disclosure, as release mechanism 400 may utilize any type of actuator having any desired shape. For example, release mechanism 400 may be implemented utilizing a handle that takes advantage of a lever action, e.g., a rotatable lever arm that performs functions of actuator 402, such as pushing prongs (e.g., 406A and 406B) to disengage release mechanism 400. In embodiments, actuator 402 may be enclosed in a protective casing (not shown), for example, to prevent accidental release of a cable.

In FIG. 4A, actuator 402 in a normal position. As depicted, actuator 402 may be located at the top end of transceiver 420 (e.g., a 10/25 GbE transceiver). In embodiments, actuator 402 may be implemented as a spring-loaded component, such as a spring-loaded release button that causes actuator 402 to return to its normal or initial position once a cable is removed from transceiver 420.

Figure 4B:
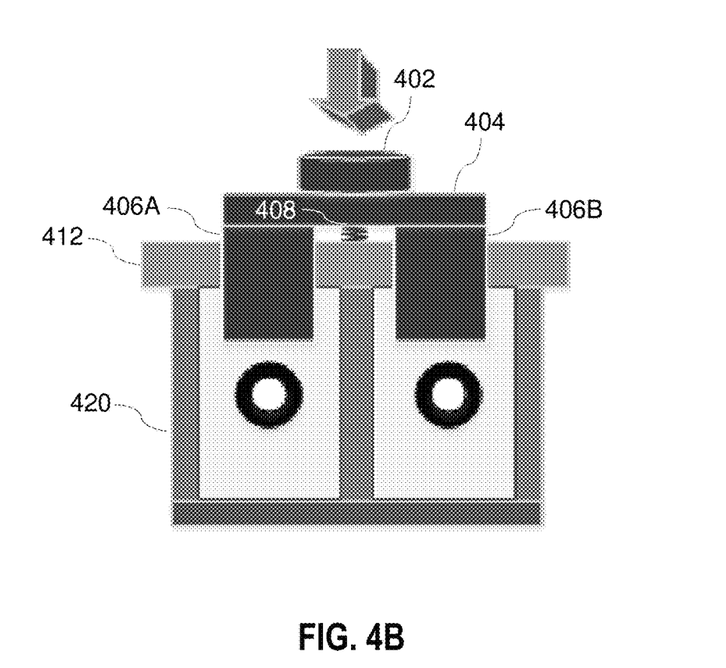
Figure 4C:
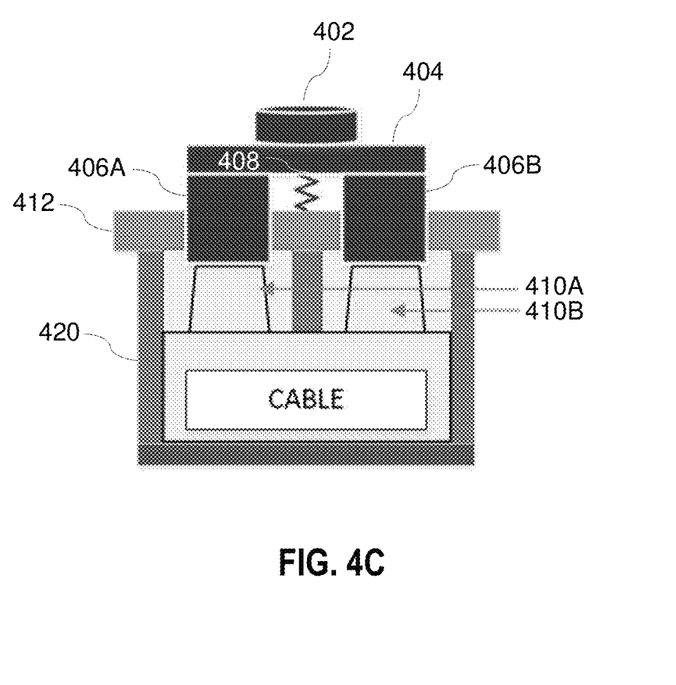
FIG. 4C and FIG. 4D are front views of the release mechanism shown in FIG. 4A and FIG. 4B having a cable inserted according to embodiments of the present disclosure.
Figure 4D:
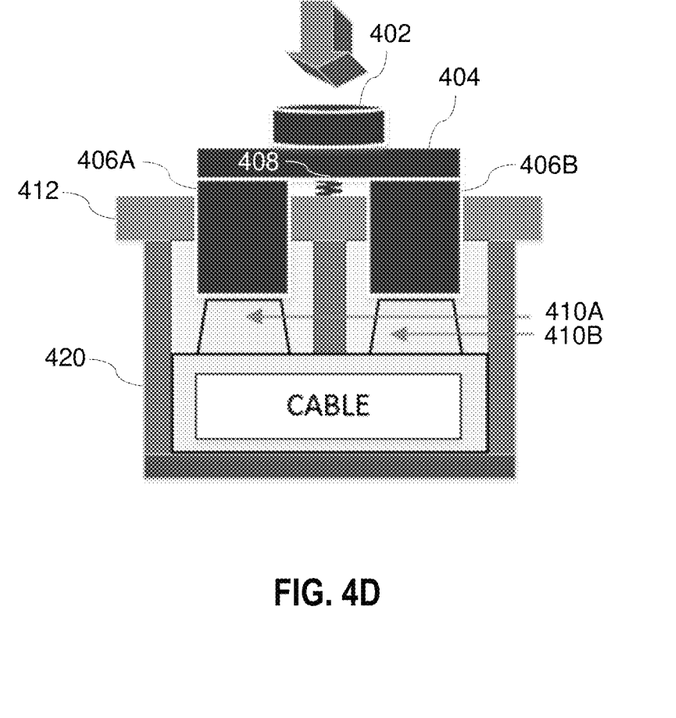

FIG. 4B is a schematic of the release mechanism 400 with prongs 406A, 406B shown in a depressed position, e.g., in response to actuator 402 having been pushed down, e.g., by a finger or a removal tool, against the surfaces of prongs 406A, 406B that, in embodiments, share substantially equal forces generated by the actuator 402. It is understood that, in embodiments, the force generated by the actuator 402 need not require human interaction and may be automated. FIG. 4C and FIG. 4D are schematics of the release mechanism 400 showing a cable present in mating housing 420 according to embodiments of the present disclosure.

In operation, once a force, e.g., a downward pressing force, is applied on actuator 402 and, by extension, to one or more interconnected parts, such as push plate 404, prongs 406A, 406B, and spring 408, which may or may not be directly connected to actuator 402, actuator 402 will be depressed and slide down through slots in plate 412, e.g., in a linear, vertical direction. In embodiments, prongs 406A, 406B may push down on cable connection flaps 410A, 410B to cause cable connection flaps 410A, 410B to be depressed and move vertically downward to unlock the locking mechanism of the cable and, ultimately, allow removal of the cable from the transceiver port (not shown in FIG. 4A-FIG. 4D).

In embodiments, connection flaps 410A, 410B may be made of wedged, bent plastic and designed to be spring-loaded, such that when releasing the locking mechanism of the cable, elastic potential energy stored in flaps or spring latches 410A, 410B may cause the cable to be pushed out of transceiver housing 420.

In embodiments, once actuator 402 is released, e.g., after the cable has been removed, spring 408 may push actuator 402 and push plate 404 back into their normal position, which will also restore prongs 406A, 406B to their normal positions shown in FIG. 4A and FIG. 4C. In that position, a cable may be inserted into the transceiver, advantageously, without hands or fingers having to touch actuator 402 on the transceiver. The cable assembly may snap into a locked position. As such, actuator 402 may operate similar to a button on a vehicle's seat belt buckle that releases the belt, here a cable assembly, that is plugged into it.

Figure 5A:
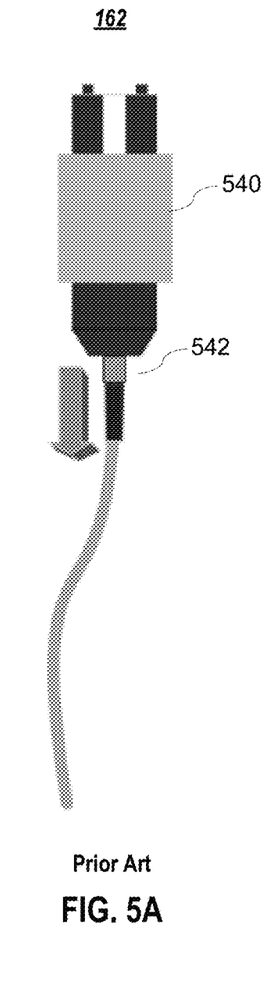
FIG. 5A is a top view of a conventional fiber optic cable assembly having a damaged tab.
Figure 5B:
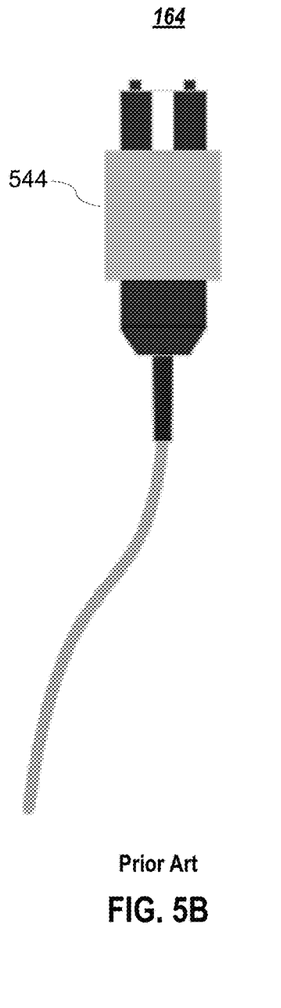
FIG. 5B is a top view of a conventional fiber optic cable assembly having no pull tab.
Figure 5C:
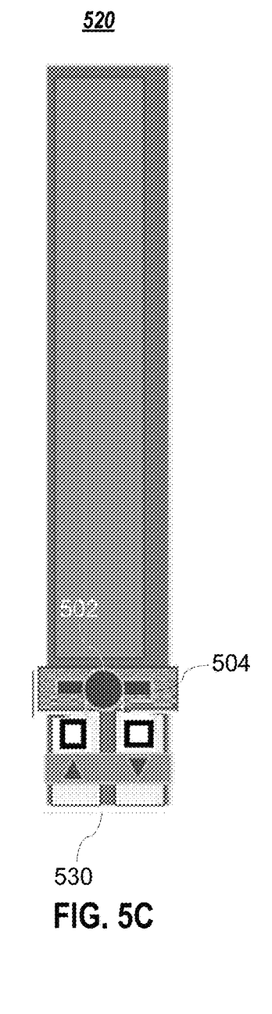
FIG. 5C is a top view of transceiver having a release mechanism according to embodiments of the present disclosure.

FIG. 5A is a top view of a conventional fiber optic cable assembly 162 having a connector 540 with a broken pull tab 542. FIG. 5B is a top view of a conventional fiber optic cable assembly 164 having a connector 544 with no pull tab. FIG. 5C is a top view of transceiver 520 having a release mechanism according to embodiments of the present disclosure.

As depicted in FIG. 5C, transceiver 520 may comprise actuator 502 and push plate 504. It is understood that, in embodiments, transceiver 520 in FIG. 5C may be any receptacle or assembly, such as a cage assembly. The assembly may be mounted to a printed circuit board (not shown) and may be configured to receive a small form-factor pluggable (SFP) transceiver, e.g., in an open-ended chamber, such as an elongated cavity of the cage assembly. In embodiments, the receptacle and the connector (e.g., 540) may have respective electrical and/or optical contacts that engage one another to establish an electrical and/or optical communicative connection.

In embodiments, a cable release mechanism may be integrated into transceiver 520, which, unlike the typically fragile fiber glass components in connector 540, 544, may be constructed from metal or any other rigid material. Advantageously, by implementing a cable release mechanism on transceiver 520, issues that may otherwise arise from release-related defects in data centers, such as wear and tear of pull-tab (e.g., 542) mounted on connector 540 are rendered immaterial. As an added advantage, even connectors (e.g., 540) with defective pull tab 542 or connectors (e.g., 544) having no release mechanism at all, as depicted in FIG. 5B, may be used and re-used. This significantly simplifies the handling of all types of cable assemblies with LC connectors (i.e., Lucent, Little, or Local connectors), irrespective of the presence, type (materials, shape, etc.), or condition (broken, damaged, deformed, etc.) of any pull tab (e.g., 542), making engaging and disengaging fiber optic cable assemblies and similar cables effortless.

In addition, various embodiments make a removing a cable with a broken tab much less likely to damage the connector (e.g., 540) or cable itself, or damage transceiver 520 and its data ports (e.g., 530), since the locking mechanism does not require forcible cable removal. As a further advantage of reducing or eliminating damage to various components, such as cables, transceivers, or ports, calls to support staff and equipment/network down time are significantly reduced, thereby, reducing overall operation and maintenance cost.

Figure 6A:
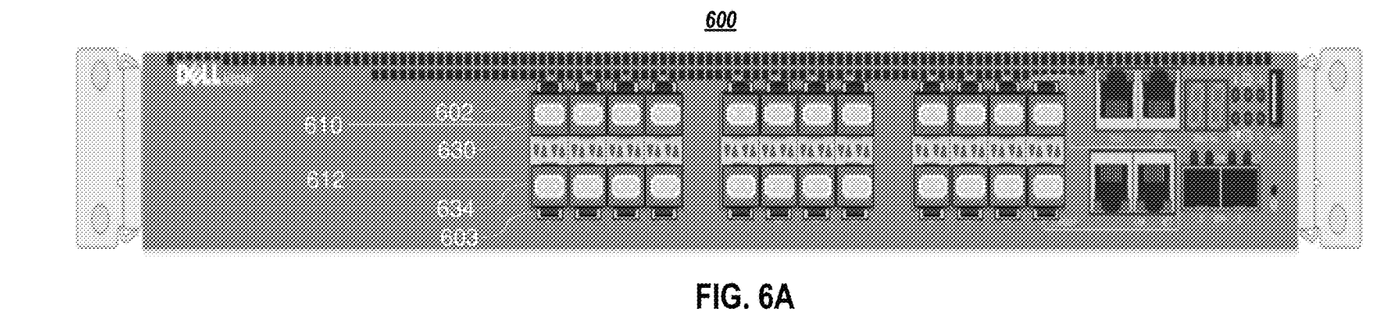
FIG. 6A is a front view of a switch having high-density ports that utilize a release mechanism according to embodiments of the present disclosure.
Figure 6B:
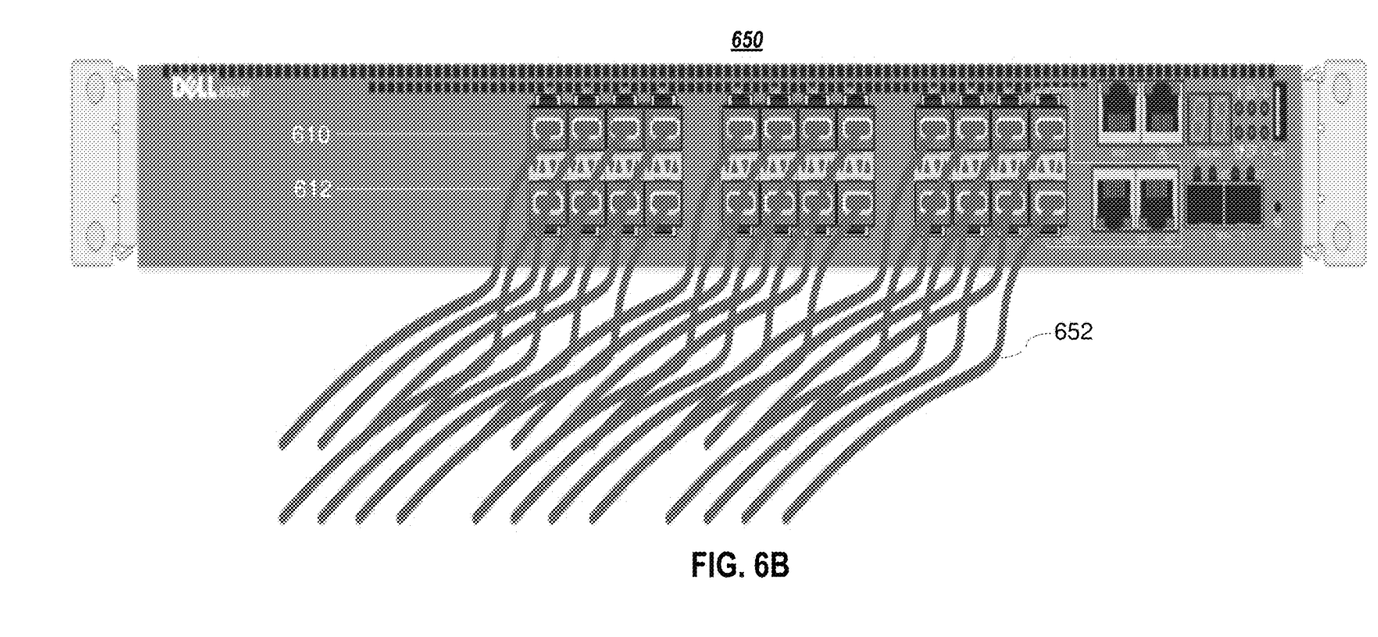
FIG. 6B is a front view of the switch shown in FIG. 6A having fiber optic cables inserted into ports according to embodiments of the present disclosure.

FIG. 6A is a front view of a switch having high-density ports (e.g., 630) that utilize a release mechanism according to embodiments of the present disclosure. FIG. 6B is a front view of the switch in FIG. 6A having fiber optic cables inserted into ports according to embodiments of the present disclosure. As depicted, neighboring transceiver slots oftentimes are in close proximity to each other and are arranged, e.g., in rows 610, 612 on the front side of switch 600, 650. In embodiments, for easy finger access with one hand and no additional tools, e.g., in high-capacity environments, actuator (e.g., 602) may be disposed on top row 610 to align with the top of assembly 630 (e.g., a transceiver assembly), and actuator 603 may be disposed at bottom row 612 such as to align with the bottom of assembly 634. In embodiments, the arrangement depicted in FIG. 6A and FIG. 6B allows easy access to actuator 603 from the bottom of row 612 of transceivers that are oriented upside down and, thus, directed away from the cables (e.g., 652) in row 634. Advantageously, cables (e.g., 652) can thus be safely removed without affecting connectors of surrounding ports, e.g., while keeping the vertical space between row 610 and 612 and, thus, allowing the form factor of switch 600, 650 to be kept relatively small.

Figure 7:
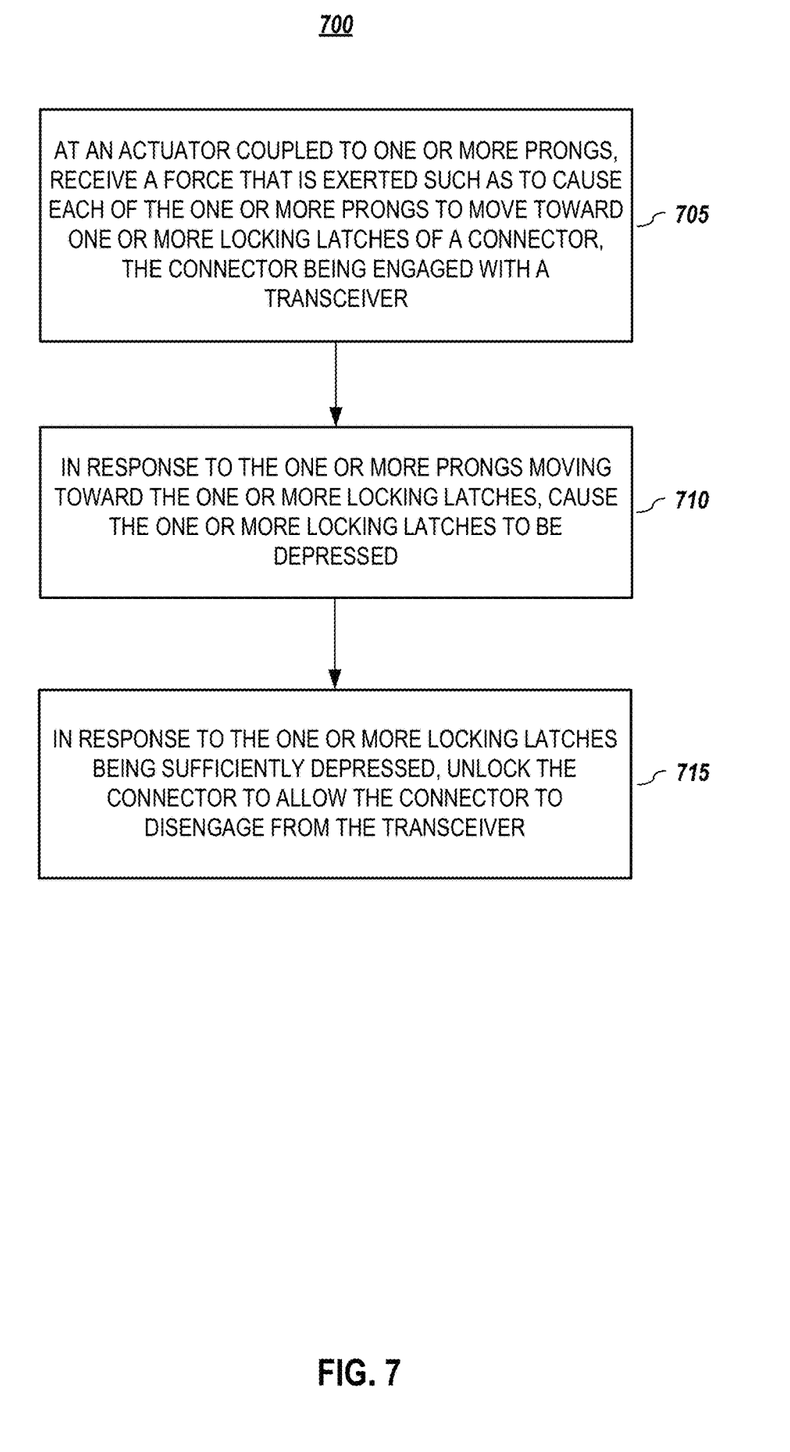
FIG. 7 depicts a flowchart for a process for disengaging a cable assembly from a switch according to embodiments of the present disclosure.

FIG. 7 depicts a flowchart for a process for disengaging a connector or cable assembly from a switch, panel, chassis, adapter, or other receptacle according to embodiments of the present disclosure. In embodiments, process 700 for disengaging the connector may begin when, at an actuator that is coupled to one or more prongs, a force is received (705) that is exerted to cause each of the prongs to move toward one or more locking latches of the connector, which may be engaged to a receptacle, e.g., to a transceiver. In embodiments, in response to the prongs moving toward the locking latches, the locking latches may be depressed (710). Finally, in response to the locking latches being sufficiently depressed, the connector may be unlocked (715), e.g., to allow the connector to disengage from the transceiver.

It shall be noted that: (1) certain steps may optionally be performed; (2) steps may not be limited to the specific order set forth herein; (3) certain steps may be performed in different orders; and (4) certain steps may be done concurrently.

Figure 8:
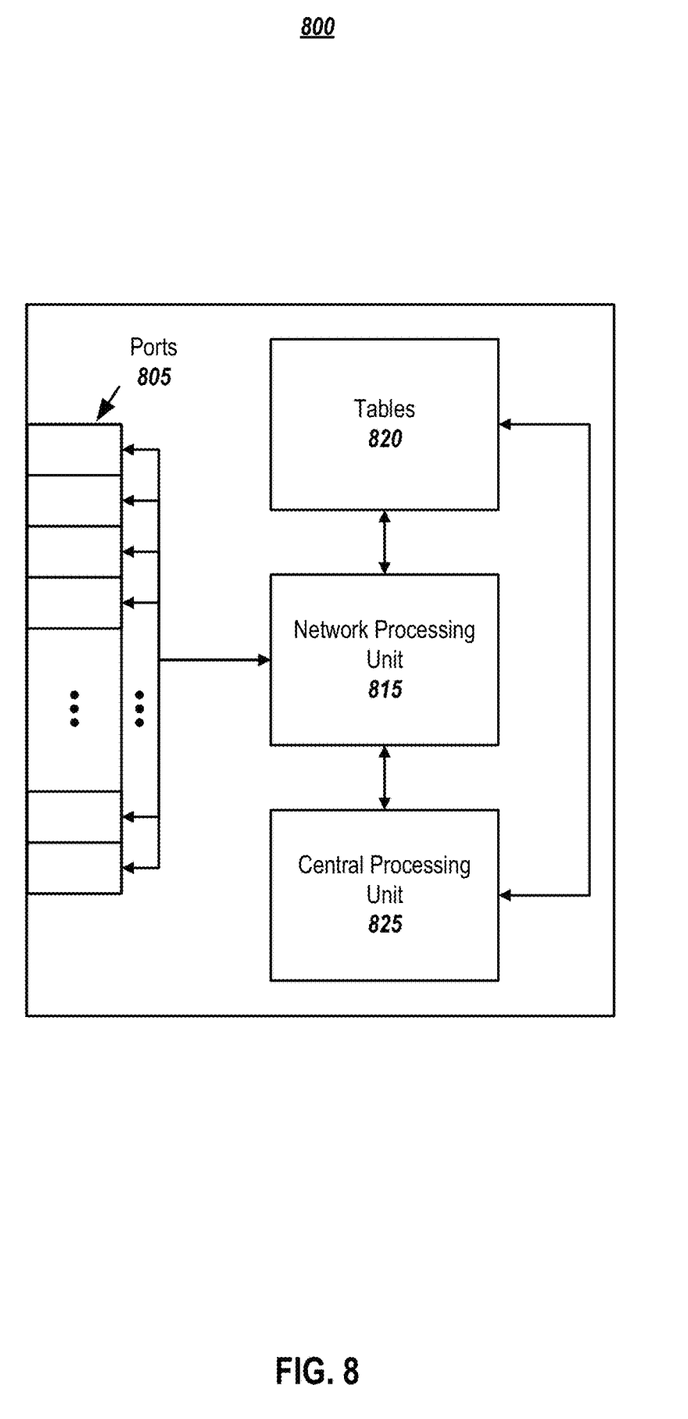
FIG. 8 depicts a block diagram of an information handling system, according to embodiments of the present disclosure.

FIG. 8 depicts a block diagram of an information handling system, according to embodiments of the present disclosure. It will be understood that the functionalities shown for system 800 may operate to support various embodiments of the present disclosure—although it shall be understood that such system may be differently configured and include different components, additional components, or fewer components.

The information handling system 800 may include a plurality of I/O ports 805, a network processing unit (NPU) 815, one or more tables 820, and a central processing unit (CPU) 825. The system includes a power supply (not shown) and may also include other components, which are not shown for sake of simplicity.

In one or more embodiments, the I/O ports 805 may be connected via one or more cables to one or more other network devices or clients. The network processing unit 815 may use information included in the network data received at the node 800, as well as information stored in the tables 820, to identify a next device for the network data, among other possible activities. In one or more embodiments, a switching fabric may then schedule the network data for propagation through the node to an egress port for transmission to the next destination.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for disengaging a connector from an information handling system, the method comprising:
    given a connector release apparatus comprising:
        an actuator;
        one or more prongs;
        a push plate coupled to the actuator;
        a plate comprising one or more holes to receive the one or more prongs;
        a spring positioned between the push plate and the plate; and
        a housing having an opening and being coupled to the push plate:
    responsive to receiving a force at the actuator causing, via the push plate, each of the one or more prongs to move toward one or more locking latches of the connector, the connector being removably coupled to the information handling system;
    in response to the one or more prongs moving toward the one or more locking latches, causing the one or more locking latches to be depressed; and
    in response to the one or more locking latches being sufficiently depressed, unlocking the connector to allow the connector to decouple from the information handling system.

2. The method according to claim 1, wherein the connector comprises a fiber optic cable assembly.

3. The method according to claim 1, wherein the connector is a small form-factor pluggable (SFP) connector.

4. The method according to claim 1, wherein the information handling system comprises a panel and a receptacle assembly.

5. The method according to claim 4, wherein the receptacle assembly comprises an SFP transceiver assembly.

6. The method according to claim 5, wherein the SFP transceiver assembly comprises circuitry to convert optical signals into electrical signals or vice versa.

7. The method according to claim 1, wherein the one or more prongs are slidably attached to the plate.

8. The method according to claim 1, wherein the one or more locking latches comprise a spring latch.

9. A cable release apparatus for disengaging a connector from an information handling system, the cable release apparatus comprising:
    an actuator;
    a push plate coupled to the actuator;
    a spring coupled to the push plate;
    one or more prongs coupled to the push plate;
    a plate comprising one or more holes to receive the one or more prongs; and
    a housing having an opening and being coupled to the push plate, the push plate distributes to the one or more prongs a force that is applied to the push plate, via the actuator, to cause each of the one or more prongs to move toward one or more latches of a connector when the connector has been releasably accepted by the opening, the one or more prongs causing the one or more latches to be depressed.

10. The cable release apparatus of claim 9, wherein the connector is part of at least one of a fiber optic cable assembly or a small form-factor pluggable (SFP) cable assembly.

11. The cable release apparatus of claim 9, wherein the information handling system comprises one or more receptacle assemblies.

12. The cable release apparatus of claim 11, wherein the one or more receptacle assemblies comprise a small form-factor pluggable (SFP) transceiver assembly.

13. The cable release apparatus of claim 12, wherein the SFP transceiver assembly comprises circuitry to convert optical signals into electrical signals or vice versa.

14. The cable release apparatus according to claim 9, wherein at least two of the actuator, the push plate, and the one or more prongs are integrated into a single component.

15. A cable release system for disengaging a connector from an information handling system, the cable release comprising:
 the information handling system comprising a switch panel that comprises a transceiver assembly;
 an actuator coupled to the transceiver assembly;
 one or more prongs;
 a push plate coupled to the actuator and to the one or more prongs;
 a plate comprising one or more holes to receive the one or more prongs;
 a spring coupled between the push plate and the plate; and
 a housing having an opening and being coupled to the push plate, in response to a connector being releasably accepted by the opening, the push plate distributing a force applied by the actuator to the one or more prongs to move the one or more prongs toward one or more latches of the connector to cause the one or more latches to be depressed to disengage the connector from the information handling system.

16. The system according to claim 15, wherein at least two of the actuator, the push plate, and the one or more prongs are integrated into a single component.

17. The system according to claim 15, wherein the connector comprises an electro-optical communication circuit.

18. The system according to claim 15, wherein, in response to the one or more latches being sufficiently depressed, the connector is unlocked such as to allow the connector to decouple from the information handling system.

19. The system of claim 15 wherein the connector is removably coupled to the housing.

20. The system of claim 15 wherein the housing is affixed to a panel of a information handling system.

* * * * *